United States Patent [19]
Shuttle

[11] Patent Number: 5,387,741
[45] Date of Patent: Feb. 7, 1995

[54] METHOD AND APPARATUS FOR SUBTERRANEAN CONTAINMENT OF HAZARDOUS WASTE MATERIAL

[76] Inventor: Anthony J. Shuttle, 524 S. Rosina Ave. #9, Somerset, Pa. 15501

[21] Appl. No.: 99,914

[22] Filed: Jul. 30, 1993

[51] Int. Cl.[6] .................... B09B 1/00; G21F 9/12
[52] U.S. Cl. ........................... 588/259; 405/55; 405/128
[58] Field of Search .............. 405/128, 129, 52–55; 252/626, 628, 633; 588/249, 259

[56] References Cited

U.S. PATENT DOCUMENTS

| | | | |
|---|---|---|---|
| 2,616,847 | 11/1952 | Cinell | 210/2 |
| 3,046,403 | 7/1962 | Montgomery | 250/106 |
| 3,093,593 | 6/1963 | Arrance | 252/301.1 |
| 3,255,896 | 6/1966 | Sklorz | 214/16 |
| 3,513,100 | 5/1970 | Stogner | 252/301.1 |
| 3,663,817 | 5/1972 | Sayers | 250/106 |
| 3,911,684 | 10/1975 | Busey | 60/644 |
| 3,925,992 | 12/1975 | Backstrom | |
| 3,935,467 | 1/1976 | Gablin | 250/507 |
| 3,983,050 | 9/1976 | Mecham | 252/301.1 |
| 4,007,965 | 2/1977 | Shuttle, Jr. | 299/11 |
| 4,171,921 | 10/1979 | Morfeldt | 405/128 |
| 4,177,386 | 12/1979 | Wachter et al. | 250/507 |
| 4,229,316 | 10/1980 | Baatz et al. | 252/301.1 |
| 4,257,912 | 3/1981 | Fleischer et al. | 252/301.1 |
| 4,321,158 | 3/1982 | Beall et al. | 252/628 |
| 4,358,221 | 11/1982 | Wickberg | 405/128 |
| 4,375,930 | 3/1983 | Valiga | 405/128 |
| 4,377,509 | 3/1983 | Haynes et al. | 252/633 |
| 4,428,700 | 1/1984 | Lennemann | 405/128 |
| 4,453,857 | 6/1984 | Serra et al. | 405/128 |
| 4,464,081 | 8/1984 | Hillier et al. | 405/128 |
| 4,586,849 | 5/1986 | Hastings | 405/128 |
| 4,650,518 | 3/1987 | Arntzen et al. | 420/3 |
| 4,652,181 | 3/1987 | Bergman et al. | 405/128 |
| 4,701,280 | 10/1987 | Canevall | 252/633 |
| 4,725,164 | 2/1988 | Sagefors | 405/128 |
| 4,834,916 | 5/1989 | Chaudon et al. | 252/633 |
| 4,842,774 | 6/1989 | Golden | 252/633 |
| 4,844,840 | 7/1989 | Feizollahi | 252/633 |
| 4,859,367 | 8/1989 | Davidovits | 252/628 |
| 4,863,638 | 9/1989 | Harper, III | 252/633 |
| 4,891,165 | 1/1990 | Suthanthiran | 252/633 |
| 4,906,408 | 3/1990 | Bouniol | 252/628 |
| 4,908,515 | 3/1990 | McLeod | 250/507.1 |
| 4,911,576 | 3/1990 | Hoffine et al. | 405/128 |
| 4,955,983 | 9/1990 | Meess et al. | 405/128 |
| 4,973,195 | 11/1990 | Sweeney et al. | 405/128 |
| 4,979,618 | 12/1990 | Pellegrini Afri | 206/459 |
| 5,078,543 | 1/1992 | Terrel | 405/128 |
| 5,078,958 | 1/1992 | Danko et al. | 405/128 X |

*Primary Examiner*—Dennis L. Taylor
*Attorney, Agent, or Firm*—Stanley J. Price, Jr.; John M. Adams

[57] ABSTRACT

Upon completion of dislodging and transporting mine material from an underground mine, the mine is converted to a repository for the disposal of hazardous waste. The mine includes a network of connected chambers each formed by surrounding sidewalls into which parallel spaced boreholes are drilled to dislodge mine material from a seam in the rock formation. For use as repository, each borehole is lined with a layer of water permeable material. Drums containing hazardous waste are encapsulated within spherical cement modules. The modules are positioned in spaced relation within the boreholes. Shock absorbing reinforcing material fills the voids within the boreholes surrounding the modules to protect the modules from damage due to seismic disturbances in the underground formation. Each of the cement modules is ventilated to dissipate heat through an air plenum into the central chamber. The boreholes are sealed in a manner to permit the drainage of water from the boreholes and provide convenient access for inspection and retrieval of the cement encapsulated drums as required.

20 Claims, 3 Drawing Sheets

METHOD AND APPARATUS FOR SUBTERRANEAN CONTAINMENT OF HAZARDOUS WASTE MATERIAL

BACKGROUND OF THE INVENTION

1. Field of the Invention

This invention relates to subterranean containment of hazardous waste material and more particularly to the storage of both low-level and high-level radioactive waste material in sealed containers that are encapsulated in cement modules stored in an underground mine that maintains stabilized positioning of the containers while providing drainage, ventilation, and access to the containers for periodic inspection.

2. Description of the Prior Art

The containment and disposal of hazardous waste material, including toxic substances and radioactive waste, is regulated by the United States Environmental Protection Agency and the Nuclear Regulatory Commission. In general, the regulations require that the hazardous materials be handled and contained in a manner that does not contaminate the environment or threaten the public health.

It is well known to store radioactive and toxic wastes in steel barrels or drums which then are stored for long term containment requiring that precautions be taken to prevent release of the hazardous waste into the environment. Consequentially, the barrels or drums must be stored in a structure that assures that the hazardous waste will be safely and permanently contained. Consequentially, provisions must be made at the storage site to prevent leaching of the hazardous waste into the soil of the underground formation and therefrom into the ground water supply. The containers must be stabilized to resist damage resulting from subsidence, earthquake, and other seismic activity. In the case of hazardous waste that generates heat, the storage site must be ventilated to prevent thermal deterioration of the containment site.

An example of containment of radioactive waste in conventional 55 gallon steel drums is disclosed in U.S. Pat. No. 3,935,467. A repository for the drums includes an elongated tube of bituminous fibre material closed at its end by treated plywood caps. A plurality of the steel drums containing the waste material is positioned in axial alignment and in spaced relation within the tube. The drums are encapsulated within the tube and spaced from one another by polyurethane foam. The foam is injected in place and completely fills the inner cavity of the tube around each drum so that the drums are separated from one another. The foam stabilizes the drums inside the tube to prevent physical damage to the drums. The foam also serves to prevent hazardous materials, such as chemicals, from seeping out of the drums. The foam prevents ground water and water vapor from coming in contact with the metal containers. A plurality of tubes containing the encapsulated metal drums can be stacked above or below ground for permanent storage.

U.S. Pat. No. 3,983,050 discloses a method for storing high-level radioactive wastes in metal canisters lined with powdered cement which mixes with water leaking into the canister to form a cement patch. The containment of hazardous waste material in cylindrical drums is also disclosed in U.S. Pat. No. 4,863,638 in which a plurality of stacked drums are banded together so that the drums are fixedly secured with respect to one another. The banded drums are then encapsulated within a plastic casing formed by a molding operation. A number of legs are attached to the bottom of the casing for positioning the casing on any type of floor area, such as an ocean floor area or landfill area.

A further example of underground storage of drums containing radioactive waste is disclosed in U.S. Pat. No. 3,255,896. The drums are stored in an underground channel structure having access openings for inspecting the containers. The containers are provided with rollers that permit the containers to be rolled into position in the channel structure.

In the dry storage of hazardous waste material, the material is contained within multiple barrier layers. The first barrier layer may include a tubular structure sealed within a concrete structure as disclosed in U.S. Pat. No. 4,834,916, or as an alternative a waste containing drum is encased within an inner lead containing shield which, in turn, is surrounded by an outer concrete receptacle as disclosed in U.S. Pat. No. 4,229,316. The receptacle is provided with tubes extending through concrete and lead enclosures for adding radioactive material into the inner container. The surrounding containers are also provided with passages for venting gases from the surrounding layers.

Another example of a multilevel above-ground repository for radioactive waste is disclosed in U.S. Pat. No. 4,842,774. The multilevel repository includes a number of containment areas arranged in a pyramidal configuration. Each containment area includes a floor and a roof formed of compacted clay to shed water away from the area. The containment areas are separated by shield walls made of either steel reinforced concrete or by a wall-shaped stack of castable concrete containers which also contain radioactive waste imbedded in concrete. Waste containers are then stacked within the areas between the shield walls.

A disposal site adaptable for aboveground and underground storage of hazardous and toxic wastes is disclosed in U.S. Pat. No. 4,844,840. The disposal site is formed over an impermeable bed which acts to collect the leachate and prevent its penetration into the ground water. The bed includes multiple layers of different types of materials, such as clay, sand, soil and gravel. The top layer is a graveled layer upon which waste canisters are stacked. The multiple layers of canisters are stacked in interlocking relation. Each canister is a reinforced concrete receptacle having a removable cover. Waste containing barrels and boxes are placed within each concrete receptacle, and the spaces between barrels within receptacles are filled with a curable fluid sealant, such as grout. The stacked canisters are sealed within a penetration barrier formed by layers of synthetic liner, clay, gravel, and soil.

U.S. Pat. No. 4,586,849 discloses a further example of an underground radioactive waste repository in which a horizontal shaft is bored into the side of a mountain. The shaft is located between two layers of rock which are substantially impervious to water. A number of side passages extend from the main shaft. The radioactive waste material is stored at the ends of the side passages in storage areas behind lead lined shielding. The waste material is contained in casings which are then stacked in the storage areas.

While it is well known to dispose of hazardous waste material by storage in containers encased in aboveground and underground repositories, a repository must be constructed exclusively as a disposal site. In underground mining operations the excavated areas are abandoned after the mine material is extracted. Therefore, there is need to utilize abandoned underground excavated areas as repositories for the storage and disposal of hazardous waste material.

SUMMARY OF THE INVENTION

In accordance with the present invention there is provided a repository for hazardous waste containment that includes a subterranean excavated site including a central chamber surrounded by an earthen formation. The central chamber is formed by an earthen overhead layer, a floor, and a plurality of walls extending between the overhead layer and the floor. A plurality of boreholes extend through each wall into the surrounding formation. The boreholes are positioned in spaced parallel relation along the length of the wall and extend from an open end portion in the chamber to a closed end portion at a preselected depth into the surrounding formation. A layer of water permeable material lines the bottom of each borehole for drainage of water out of the borehole into the chamber. A plurality of cement modules are positioned in spaced relation in each borehole between the open end portion and the closed end portion. Each of the cement modules encapsulates a container holding hazardous waste material. Reinforcing means surrounds the cement modules in the borehole for absorbing seismic shock to stabilize the cement modules in the borehole. Means is provided for closing the borehole open end portion and permitting drainage of water out of the borehole into the central chamber.

Further in accordance with the present invention there is provided a method for underground containment of hazardous waste materials comprising the steps of excavating an underground rock formation to form a mine including a chamber defined by a plurality of substantially vertical sidewalls extending between a roof and a floor of rock material. A series of boreholes are drilled into each of the sidewalls to dislodge mine material from the rock formation. The dislodged mine material is conveyed from the boreholes and out of the chamber so that the boreholes and chamber are free of all material. The boreholes are formed in substantially spaced parallel relation the length of the sidewalls. Each borehole extends a preselected depth into the rock formation from an open end portion in the chamber to a closed end portion positioned at an elevation above the open end portion. The boreholes are separated by the surrounding rock formation. The bottom of each borehole is lined with a layer of water permeable material. Containers holding hazardous waste material are encapsulated in cement modules. A plurality of the cement modules are positioned in spaced relation with each borehole. The cement modules are reinforced in the borehole to resist seismic vibration. The open end portion of each borehole is sealed while permitting water to flow through the water permeable material and out of the borehole. The water flowing out of the boreholes is directed into a drain in the floor of the chamber.

Additionally, the present invention is directed to a system for containment of hazardous waste material that includes an underground mine having at least one chamber defined by surrounding sidewalls, a mine roof, and a mine floor. A plurality of boreholes are formed in the sidewalls by the extraction of mine material from the sidewalls and removal of the extracted mine material out of the mine. The boreholes extend from the chamber into the sidewalls. The boreholes are positioned in spaced, parallel relation along the length of the sidewalls. Each borehole has an open end portion in the chamber and a closed end portion at preselected depth in the side wall. The borehole is sloped from the closed end portion downwardly to the open end portion to promote the flow of water out of the borehole into the chamber. A layer of water permeable material lines the bottom of each borehole. A plurality of cement spheres encapsulate containers of hazardous waste material positioned in spaced relation within the boreholes. Shock absorbing means is positioned in the boreholes in contact with the cement spheres for protecting the cement spheres from damage due to seismic disturbance. Means is provided for sealing the open end portions of the boreholes to permit the drainage of water therefrom. Drainage means is positioned within the chamber for collecting water flowing out of the boreholes.

Accordingly, a principal object of the present invention is to provide method and apparatus for the storage and containment of hazardous waste material in the chambers and cavities formed in an underground mining operation.

Another object of the present invention is to provide a repository for low-level and high-level radioactive waste in a network of boreholes formed in an underground rock formation by a mining operation thereby utilizing the underground mine structure for the containment of radioactive waste.

A further object of the present invention is to provide a method and apparatus for the stabilized containment of hazardous waste material in an underground mine after the mining operation is completed and the dislodged mine material is removed thereby leaving a repository for hazardous waste disposal.

Another object of the present invention is to safely contain radioactive material within cement modules that are securely stored to resist seismic disturbances within a network of passageways developed as a part of a mining operation allowing periodic inspection of the passageways to detect leakage of the radioactive material.

These and other objects of the present invention will be more completely disclosed and described in the following specification, the accompanying drawings, and the appended claims.

DESCRIPTION OF THE PREFERRED EMBODIMENTS

Figure 1:
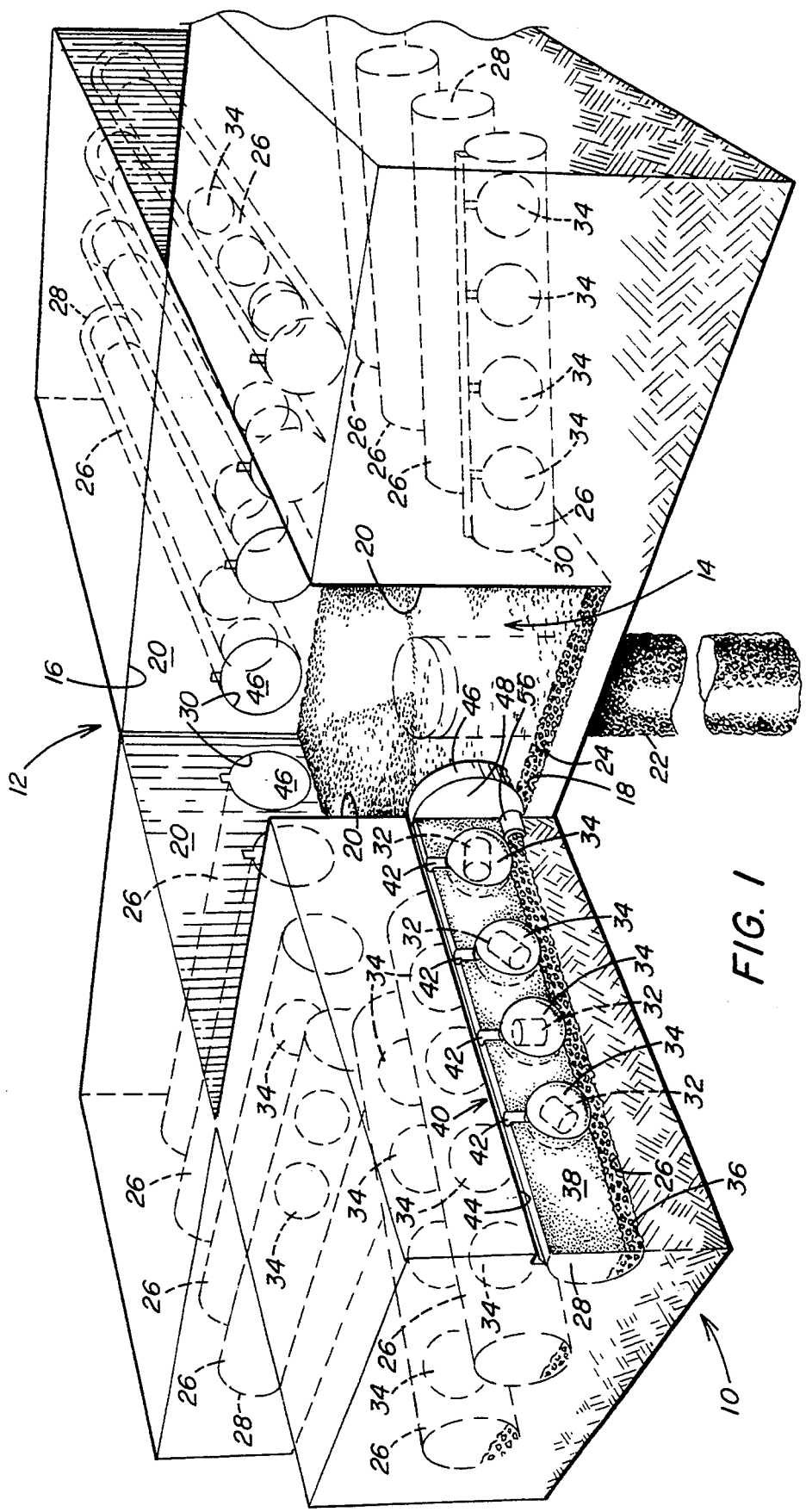
FIG. 1 is an isometric view partially in section of an underground mine, illustrating a central chamber having a plurality of boreholes extending through the chamber sidewalls and containing a plurality of cement encapsulated drums of hazardous waste reinforced within the boreholes to resist damage due to seismic disturbance.
Figure 2:
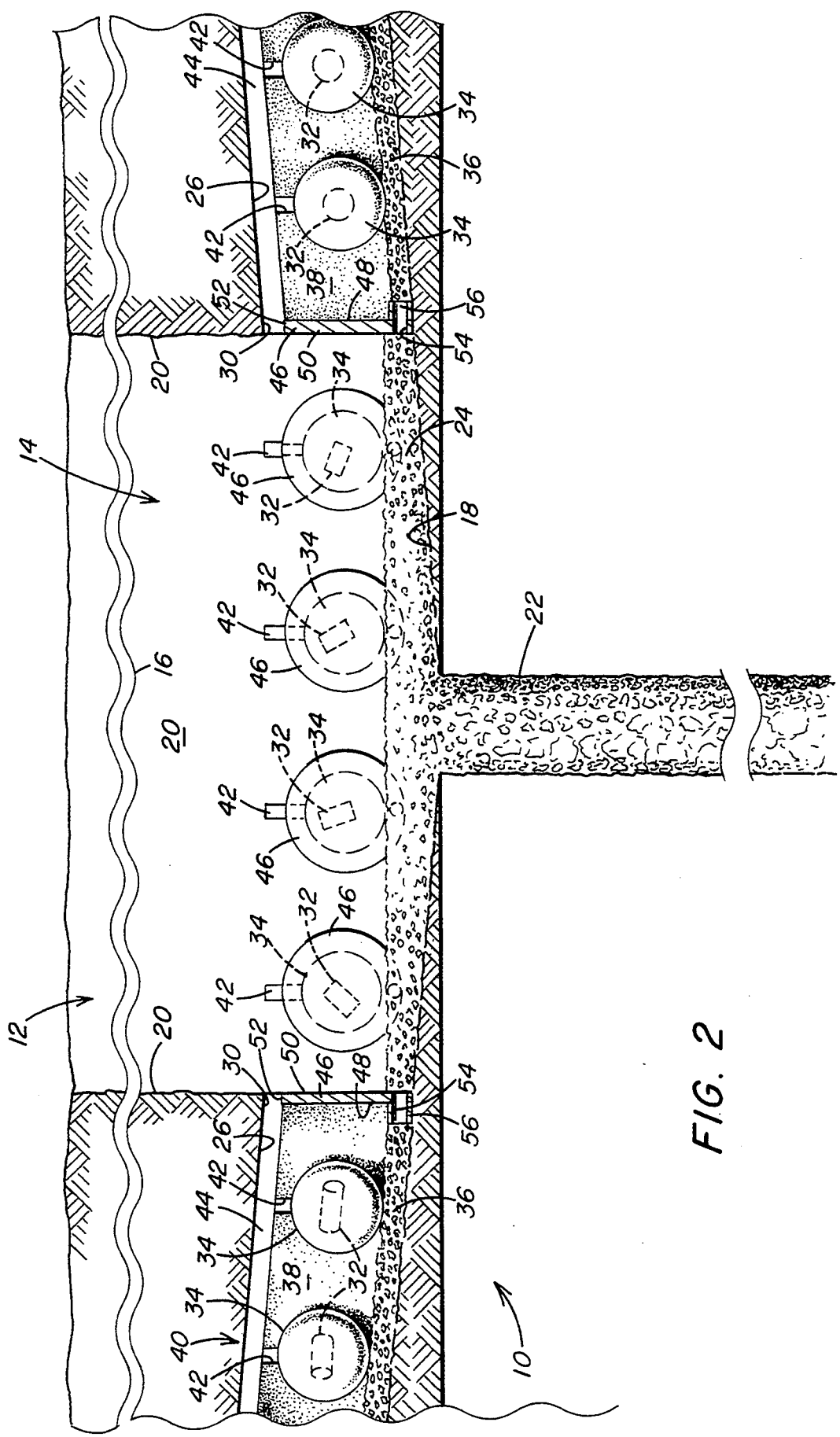
FIG. 2 is a fragmentary sectional view in side elevation of the chamber shown in FIG. 1, illustrating the cement modules surrounded by shock absorbing material in the boreholes.

Referring to the drawings and particularly to FIGS. 1 and 2, there is illustrated an underground rock formation generally designated by the numeral 10 containing mine material that has been extracted in the formation of an underground mine generally designated by the numeral 12. The mine 12 is developed in accordance with a preselected method of mining as disclosed in U.S. Pat. No. 4,007,965 entitled "Method Of Recovering Useful Minerals From Subterranean Deposits Thereof" issued Feb. 15, 1977 which is incorporated herein by reference.

Figure 3:
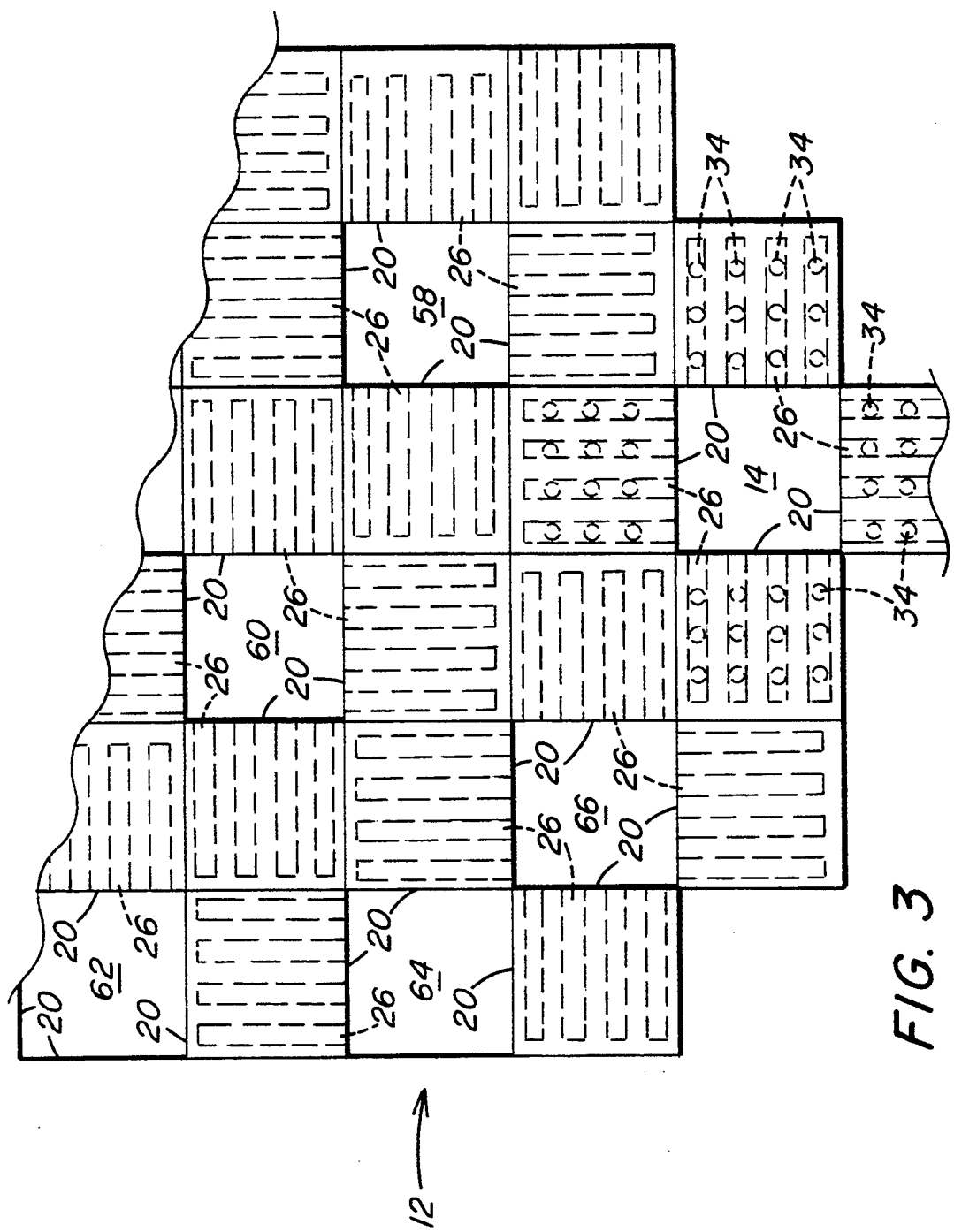
FIG. 3 is a diagrammatic plan view of an underground mine formation, illustrating a network of excavated chambers with boreholes in surrounding sidewalls utilized as a repository for hazardous waste in accordance with the present invention.

FIG. 3 schematically illustrates a top plan view of the mine 12 constructed in accordance with the mining operation disclosed in the above-identified patent incorporated by reference and discussed in greater detail hereinafter. The mining method develops a checkerboard pattern of chambers which are formed underground to provide access to the seam of mine material, such as coal. The coal seam is exposed in the sidewalls forming the chamber. The chambers are progressively developed throughout the underground formation to be mined. The chambers are formed using conventional mining equipment, and the dislodged material is transported out of the mines. The chambers are free of material to provide access to the surrounding sidewalls. The mine material is extracted from the seams in the sidewalls by boring into the sidewalls.

As disclosed in the above referenced patent, the chamber 14 is formed by either surface mining or deep pit operations, depending on the location of the seam of mine material to be extracted. The seam may be at or near the surface or located at a depth of hundreds of feet below the surface. Preferably, in the use of the excavated mine 12 as a repository for hazardous waste, the chambers 14 are at least 100 feet below the surface.

The underground chamber 14 is substantially square in horizontal section. The rock material is completely removed from the chamber 14. Suitable passageways, not shown, provide access to the chamber 14 from the surface for the movement of operating personnel, equipment, and dislodged mine material. In the formation of the chamber 14 the mine material is conventionally transported or conveyed to the surface for further processing.

The central chamber 14 is formed by a conventional material dislodging operation. The dislodged material is transported to the surface, and the chamber 14 remaining includes a roof 16 at a preselected elevation above a floor 18. Extending between the floor 18 and roof 16 are substantially vertical sidewalls 20. Preferably, the floor 18 of chamber 14 slopes downwardly at the base of the sidewalls 20 toward the center of the chamber 14 where a deep well 22 is sunk into the rock formation below the chamber 14. The deep well 22 is filled with water permeable material, such as large stone aggregate. The chamber floor 18 is also lined with a layer 24 of a gravel aggregate.

In accordance with the mining operation disclosed in U.S. Pat. No. 4,007,965 once the central chamber 14 is formed and the dislodged material extracted therefrom, a series of boreholes 26 are drilled in the sidewalls 20 by auger mining equipment. The boreholes 26 are advanced through the sidewalls 20 to a preselected depth into the seam of mine material. As the mine material is dislodged from the rock formation, the dislodged material is conveyed out of the boreholes 26 to the central chamber 14 and therefrom out of the mine for processing.

Each borehole 26 is advanced a preselected depth into the rock formation, thereby forming a closed end portion 28 and an open end portion 30. For example, the boreholes 26 may extend to a depth between 100 to 200 feet into the mine seam and have a 5 foot diameter. Preferably, the boreholes 26 are formed to slope downwardly from the closed end portion 28 to the open end portion 30 to facilitate the flow of water out of the boreholes into the central chamber 14 and therefrom through the layer 24 of rock on the floor 18 into a sump formed by the deep well 22 also containing rock.

The boreholes 26 are drilled into the sidewalls 20 at a position closely adjacent to the floor 18 and in substantially spaced parallel relation along the length of the sidewalls. In one example, the length of each sidewall is 200 feet; therefore, a considerable number of boreholes 26 having 5 foot diameters can be drilled in the sidewalls. For purposes of illustration, FIG. 1 includes only a representative number of boreholes 26 formed in the sidewalls 20.

Upon completion of the material dislodging operation in the central chamber 14, a network of boreholes 26 are drilled into the sidewalls 20. While the opening of each borehole is relatively small, a substantial amount of mine material is dislodged and removed from the borehole. When the borehole drilling is completed in all the sidewalls 20 surrounding the chamber 14, an extensive network of cavities is formed in the surrounding rock formation. The cavities comprising the boreholes 26 are readily accessible from the central chamber 14 and are reinforced by the rock material remaining between the boreholes. This structure formed by the underground mining operation is particularly suited as an underground repository for the storage of hazardous waste material in conformance with the requirements of the United States Environmental Protection Agency and the Nuclear Regulatory Commission.

In accordance with the present invention, the underground mine 12 is utilized as a tunnel repository for toxic waste, such as chemicals, and both low-level and high-level radioactive waste. The radioactive waste is conventionally contained in 55 gallon steel drums or cylinders 32, as shown in FIG. 1. However, prior to depositing in the underground mine 12, the drums 32 are encapsulated within cement modules 34. The cement modules 34 may have any desired configuration such as square, rectangular or spherical.

Preferably, the modules 34 are generally spherical in shape to provide maximum protection for the drums 32 within the boreholes 26. The spherical configuration facilitates entry and positioning of the modules in the boreholes 26 having a complementary circular cross section. In view of the fact that the boreholes 26 may extend up to 200 feet into the rock formation, a considerable number of spherical cement modules 34 are easily positioned in each borehole. Therefore, it should be understood that only a representative number of modules 34 are illustrated in each borehole 26 in FIG. 1.

Before the cement modules 34 are positioned in the boreholes 26, a layer 36 of water permeable material, such as gravel, is applied to the base of each borehole. The gravel layer 36 serves to direct water that collects within the borehole away from the modules and downwardly along the sloped base of the borehole into the central chamber 14. In the central chamber 14, the water is directed through the rock layer 24 along the sloped floor 18 into the rock filled sump 22. The layer 36 of gravel is built up to a preselected depth in each borehole 26.

The cement modules 34 encapsulating the waste containing drums 32 are positioned in the boreholes. The first module 34 is advanced to the far end of the borehole adjacent the closed end 28. Additional modules 34 are spaced a preselected distance apart toward the open end portion 30. Once the cement modules 34 are in place within the borehole 26, the borehole is then filled with a reinforcing material generally designated by the numeral 38. The reinforcing material 38 stabilizes the modules 34 in spaced relation and forms a barrier seal around each module 34 in the borehole 26.

In one embodiment, the reinforcing material 38 includes a polyurethane foam material that is mixed and formed in place within the boreholes 26 in a conventional manner. The foam 38 has a cellular structure that forms a seal around each module 34. The foam material also has a structural strength that is capable of absorbing impact forces applied to the modules 34 due to subsidence, earthquake, and other seismic movement of the surrounding rock formation.

The foam reinforcing material 38 seals against the penetration of gases into the modules 34 that could result in deterioration of the steel drums 32. Also any leakage of material out of the drum 32 and module 34 is contained by the cellular structure of the foam. With the foam embodiment of the reinforcing material 38 around the modules 34, the foam is added so as to completely encase all of the modules 34 within a borehole 26.

In the process of reinforcing the cement modules 34 using the foam material 38, a ventilation system generally designated by the numeral 40 is constructed above the modules 34 and along the length of the borehole 26 into the central chamber 14. The ventilation system 40 serves to dissipate heat generated from hazardous material contained within the drums 32. The ventilation system 40 includes vertical passages 42 extending upwardly from the surface of each module 34 to a common substantially horizontal passage 44 that extends the length of the borehole 26 to the open end portion 30. The interconnected passageways 42 and 44 form an air plenum for the dissipation of heat away from the drums 32 through the modules 34 to the central chamber 14.

In another embodiment of the reinforcing material 38 surrounding the cement modules 34 in each borehole 26, a collapsible barrier mechanisms is utilized to stabilize the modules 34 to resist damage due to a seismic disturbance. The collapsible barrier mechanism includes an accordion structure of movable plates (not shown) separating one module from another. The plates are sufficiently rigid in a first position to stabilize the modules in the bore. In the event of seismic movement of the surrounding rock structure, the plates collapse to a second position to absorb the shock and reduce the impact of the force applied to the modules. It should be understood that the reinforcing material 38 may be any structure that stabilizes the position of the modules 34 in the boreholes 26 and is capable of absorbing shock to cushion the modules to prevent their fragmentation and damage to the drums 32 containing the hazardous waste.

After the reinforcing material 38 is positioned in surrounding relation with the cement modules 34 and the ventilation system 40 is in place, the open end portion 30 of the borehole 26 is sealed. The borehole 26 is sealed by a cap 46 positioned in the borehole open end portion 30. The seal cap 46 has a configuration complementary with the configuration of the borehole open end portion 30. For example, as seen in FIGS. 1 and 2, the cap 46 has a circular configuration corresponding substantially to the diameter of the borehole 26. The cap 46 has a preselected thickness and extends partially into the borehole 26. A rear surface 48 of the cap 46 is in contact with the reinforcing material 38. A front surface 50 of the cap 46 is flush or aligned with the surface of the vertical sidewall 26, as seen in FIG. 2. In this manner, the seal cap 46 projects into the borehole.

The seal cap 46 is fabricated of any material that is capable of providing a gas impermeable seal over the open end portion 30. The seal cap 46 may be fabricated of cement or metal with the rear surface 48 lined with lead. In this respect, the seal cap 46 forms a barrier shield at the open end portion 30 of the borehole 26. However, the seal cap is readily movable from the borehole open end portion 30 to permit inspection of the borehole 26, as well as, provide access to the borehole 26 for retrieval of the cement encapsulated steel drums 32. In this manner, inspection of all the boreholes 26 is conveniently accomplished from the central chamber 14.

Further as illustrated in FIGS. 1 and 2, the seal cap 46 has an upper edge 52 that is positioned below the ventilation passageway 44, so as not to obstruct the passageway 44. In addition, the seal cap 46 includes an opening 54 at the lower edge portion of the cap that extends into the rock layer 24 on the chamber floor 18. A conduit 56 extends through the opening 54 in the seal cap 46. The conduit 56 is imbedded in the gravel layer 36 so that water flowing through the layer 36 is directed down the sloped incline of the borehole 26 and through the conduit 56 into the layer 24 of rock on the chamber floor 18. The water that collects within the rock layer 24 on the chamber floor 18 is directed centrally into the aggregate filled sump 22. Preferably, the sump 22 extends to a depth between about 300 to 1000 feet based upon the geological formation. This arrangement for draining the boreholes 26 into the sump 22 prevents drain water from coming in contact with the cement encapsulated drums 32. Also in the event waste material should leak from a drum 32 and the surrounding module 34, the leakage would be detected by inspection of the water drained from the borehole.

Accordingly, with the present invention an underground mine or excavation is utilized after the mining or excavation operation is complete as a repository for the disposal of hazardous waste, including low-level and high-level radioactive waste. The underground mine is adapted to the rules and regulations set forth by the Nuclear Regulatory Commission for an underground repository of hazardous waste. The steel drums 32 containing the hazardous waste are encapsulated within the cement modules 34 that are stabilized within reinforcing material 38 occupying the boreholes 26 to resist seismic disturbances acting upon the modules 34. The modules 34 encased within the reinforcing material 38 are sealed in the boreholes 26 to form an overall barrier system. The barrier system safely contains the waste material in an underground facility that protects against radiation exposure and release of radioactive material to the environment. The same benefits are achieved in the disposal of toxic chemical waste. While the barrier system of the present invention prevents exposure of the environment to the stored hazardous waste, the hazardous waste is readily accessible for periodic inspection and retrieval of the waste material as required from the underground mine 12.

The underground mine chamber 14 illustrated in FIGS. 1 and 2 is an example of only one chamber within the entire underground mine 12 that can be utilized as a repository for hazardous waste. As illustrated in FIG. 3, the developed underground mine 12 includes a network of chambers 58, 60, 62, 64 and 66 each having an identical structure of boreholes as described above. Each chamber of the underground mine 12 includes surrounding sidewalls 20 into which boreholes 26 are drilled to dislodge the mine material from the seam. Once the mining operation is completed, the chambers and boreholes are available for use as a ready repository for the disposable of hazardous waste material. With a minimum of expense, the underground mine 12 is converted into a hazardous waste repository. A substantial savings is realized in not having to construct the site exclusively as a repository. Also, rather than abandon the mine 12, a secondary use for the mine 12 is made available by the present invention.

It should be understood that in the development of the underground mine 12 each of the chambers is accessible to one another underground. For example, a suitable passageway extends through the rock formation to connect chamber 14 with chamber 58. Once the installation of the cement encased steel drums 32 in chamber 14 is complete, the repository operation moves to chamber 58. From chamber 58, the repository operation progresses to additional chambers 60, 62, 64, 66 and to any other chambers formed as a result of the underground mining operation. Thus, the underground mine system 12 provides a convenient and economical site for the repository of hazardous waste material that meets the requirements of the Environmental Protection Agency and the Nuclear Regulatory Commission.

According to the provisions of the patent statutes, I have explained the principle, preferred construction, and mode of operation of my invention and have illustrated and described what I now consider to represent its best embodiments. However, it should be understood that within the scope of the appended claims, the invention may be practiced otherwise than as specifically illustrated and described.

I claim:

1. A repository for hazardous waste containment comprising,
    a subterranean excavated site including a central chamber surrounded by an earthen formation,
    said central chamber formed by an earthen overhead layer, a floor, and a plurality of walls extending between said overhead layer and said floor,
    a plurality of boreholes extending through each wall into the surrounding formation, said boreholes being positioned in spaced parallel relation along the length of said wall and extending from an open end portion in said chamber to a closed end portion a preselected depth into the surrounding formation,
    a layer of water permeable material lining the bottom of said borehole for drainage of water out of said borehole into said chamber,
    a plurality of cement modules positioned in spaced relation in said borehole between said open end portion and said closed end portion,
    said cement modules each encapsulating a container holding hazardous waste material,
    reinforcing means surrounding said cement modules in said borehole for absorbing seismic shock to stabilize said cement modules in said borehole, and
    means for closing said borehole open end portion and permitting drainage of water out of said borehole into said central chamber.

2. A repository for hazardous waste containment as set forth in claim 1 in which,
    said cement modules have a generally spherical configuration enclosing a sealed container holding hazardous waste, and
    said cement modules having a diameter less than the diameter of said borehole for insertion in and removal from said borehole.

3. A repository for hazardous waste containment as set forth in claim 1 which includes,
    means communicating with said cement modules in said boreholes for ventilating the area around said cement modules to dissipate heat from said boreholes to said chamber.

4. A repository for hazardous waste containment as set forth in claim 3 in which,
    said means for ventilating includes an air plenum extending from each cement module through said borehole to said chamber.

5. A repository for hazardous waste containment as set forth in claim 1 in which,
    said reinforcing means includes a barrier of foam material filling the voids around said cement modules in each borehole to maintain said cement modules in position within said boreholes, and
    said foam material cushioning said cement modules to resist shock applied thereto by seismic disturbance.

6. A repository for hazardous waste containment as set forth in claim 1 in which,
    said reinforcing means includes shock absorbing material positioned between said cement modules in said borehole, and
    said shock absorbing material being compressible so as to absorb forces generated from seismic disturbances acting upon said cement modules and reduce the impact of the forces applied to said cement modules.

7. A repository for hazardous waste containment as set forth in claim 1 which includes,
    a drainage system in said chamber for directing water out of said boreholes to a collection point in said floor of said chamber.

8. A repository for hazardous waste containment as set forth in claim 7 which includes,
    a sump extending a preselected depth from said chamber floor downwardly into said earthen formation,
    said sump being filled with water permeable material,
    said chamber floor being sloped downwardly from said sidewalls to said sump to promote the flow of water from said boreholes into said sump, and
    a layer of water permeable material covering said chamber floor.

9. A repository for hazardous waste containment as set forth in claim 1 in which,
    said boreholes are sloped downwardly from said closed end portion to said open end portion to promote the flow of water out of said boreholes.

10. A repository for hazardous waste containment as set forth in claim 1 which includes,
    seal means for closing said boreholes while permitting the flow of water out of said boreholes to drain said boreholes and the flow of air to and from said boreholes to dissipate heat generated by the hazardous waste in said boreholes.

11. A method for underground containment of hazardous waste materials comprising the steps of, excavating an underground rock formation to form a mine including a chamber defined by a plurality of substantially vertical walls extending between a roof and a floor of rock material, drilling a series of boreholes into each of the walls to dislodge mine material from the rock formation, conveying the dislodged mine material from the boreholes and out of the chamber so that the boreholes and chamber are free of all material, forming the boreholes in substantially spaced parallel relation the length of the sidewalls, extending each borehole a preselected depth into the rock formation from an open end portion in the chamber to a closed end portion positioned at an elevation above the open end portion, separating the boreholes by the surrounding rock formation, lining the bottom of each borehole with a layer of water permeable material, encapsulating containers holding hazardous waste material in cement modules, positioning a plurality of the cement modules in spaced relation within each borehole, reinforcing the cement modules in the borehole to resist seismic vibration, sealing the open end portion of each borehole while permitting water to flow through the water permeable material and out of the borehole, and directing water flowing out of the boreholes into a drain in the floor of the chamber.

12. A method as set forth in claim 11 which includes, forming the cement modules in a generally spherical configuration, and
positioning the spherical cement modules in the boreholes having a cross sectional configuration complementary with the spherical configuration of the cement modules.

13. A method as set forth in claim 11 which includes, cushioning the cement modules in the boreholes to resist the impact of forces transmitted to the cement modules due to seismic disturbances in the surrounding rock formation.

14. A method as set forth in claim 11 which includes, filling the voids in the boreholes surrounding the cement modules with a foam material to maintain the cement modules in spaced relation within the boreholes and cushion the cement modules to reduce the impact of forces due to seismic disturbances applied to the cement modules.

15. A method as set forth in claim 11 which includes, ventilating the boreholes into the chamber to dissipate the buildup of heat from the hazardous waste in the boreholes.

16. A method as set forth in claim 11 which includes, directing the flow of water from all of the boreholes in the walls of the chamber to a single location in the floor of the chamber for inspection of the water for the presence of hazardous waste material leaked from the containers.

17. A system for containment of hazardous waste material comprising, an underground mine having at least one chamber defined by surrounding sidewalls, a mine roof, and a mine floor, a plurality of boreholes formed in the sidewalls by the extraction of mine material from the sidewalls and removal of the extracted mine material out of the mine, said boreholes extending from said chamber into said sidewalls, said boreholes positioned in spaced, parallel relation along the length of said sidewalls, each borehole having an open end portion in said chamber and a closed end portion at a preselected depth in said sidewall, said borehole being sloped from said closed end portion downwardly to said open end portion to promote the flow of water out of said borehole into said chamber, a layer of water permeable material lining the bottom of said borehole, a plurality of cement spheres encapsulating containers of hazardous waste material positioned in spaced relation within said boreholes, shock absorbing means positioned in said boreholes in contact with said cement spheres for protecting said cement spheres from damage due to seismic disturbance, means for sealing said open end portions of said boreholes to permit the drainage of water therefrom, and drainage means positioned within said chamber for collecting water flowing out of said borehole.

18. A system for containment of hazardous waste material as set forth in claim 17 which includes, a plenum of air passages extending from said cement spheres through said shock absorbing means into said chamber for the dissipation of heat generated by the hazardous waste material in said containers.

19. A system for containment of hazardous waste material as set forth in claim 17 in which, said drainage means includes a sump centrally located within said chamber for detecting the presence of hazardous waste material in the water flowing out of the boreholes.

20. A system for containment of hazardous waste material as set forth in claim 17 which includes, a plurality of chambers formed in said underground mine and containing boreholes in sidewalls thereof, and said plurality of chambers being interconnected and connected to said one chamber forming a network of sites for the repository of hazardous waste material.

* * * * *